United States Patent [19]
Matsuto et al.

[11] Patent Number: 4,938,024
[45] Date of Patent: Jul. 3, 1990

[54] HYDROSTATIC CONTINUOUSLY VARIABLE TRANSMISSION

[75] Inventors: Takushi Matsuto, Saitama; Tsutomu Hayashi; Yoshihiro Nakajima, both of Tokyo; Kazuhiko Nakamura, Kanagawa; Atsuo Hojo, Tokyo, all of Japan

[73] Assignee: Honda Giken Kogyo Kabushiki Kaisha, Tokyo, Japan

[21] Appl. No.: 312,952

[22] Filed: Feb. 17, 1989

[30] Foreign Application Priority Data

Feb. 18, 1988 [JP] Japan .................. 63-35487
Feb. 19, 1988 [JP] Japan .................. 63-36979

[51] Int. Cl.$^5$ .............................. F16D 31/02
[52] U.S. Cl. ............................ 60/468; 60/487; 60/488; 60/489; 91/482
[58] Field of Search .......... 417/294; 60/487, 488, 60/490, 489, 468, 494, 325; 91/506, 482

[56] References Cited

U.S. PATENT DOCUMENTS

| | | | |
|---|---|---|---|
| 2,648,952 | 8/1953 | Dasher | 417/294 X |
| 2,844,002 | 7/1958 | Pavesi | 91/480 X |
| 3,175,363 | 3/1965 | Molly | 91/506 X |
| 3,600,108 | 8/1971 | Tomita et al. | 417/294 |
| 3,663,125 | 5/1972 | Freeman | 417/294 |
| 4,671,134 | 6/1987 | Luo | 74/689 |
| 4,745,748 | 5/1988 | Hayashi | 60/489 |
| 4,748,898 | 6/1988 | Hayashi | 92/12.2 |
| 4,776,165 | 10/1988 | Iino | 60/431 |
| 4,781,022 | 11/1988 | Hayashi | 60/489 |
| 4,827,721 | 5/1989 | Hayashi | 60/489 |

FOREIGN PATENT DOCUMENTS

| | | |
|---|---|---|
| 0206550 | 12/1986 | European Pat. Off. |
| 0209286 | 1/1987 | European Pat. Off. |
| 0243004 | 10/1987 | European Pat. Off. |
| 55-1290 | 1/1980 | Japan |
| 56-95722 | 8/1981 | Japan |
| 62-167970 | 7/1987 | Japan |
| 62-224769 | 10/1987 | Japan |
| 62-224770 | 10/1987 | Japan |

Primary Examiner—Edward K. Look
Attorney, Agent, or Firm—Lyon & Lyon

[57] ABSTRACT

In a hydrostatic continuously variable transmission, a pump cylinder of a swashplate type hydraulic pump is integrally and coaxially coupled with a motor cylinder of a swashplate type hydraulic motor. A number of distributor valves are radially arranged for reciprocal movement between radially inner and outer positions to put a large number of pump ports in the hydraulic pump into communication with the higher and lower pressure oil passages, and an eccentric ring circumscribed about the distributor valves is connected to an input member of the hydraulic pump for movement between a clutch OFF position and a clutch ON position. A clutch spring is connected to the eccentric ring for biasing the eccentric ring toward the clutch OFF position, and a weight is added to the eccentric ring and adapted to exhibit a centrifugal force for moving the eccentric ring toward the clutch ON position against a spring force of the clutch spring.

1 Claim, 10 Drawing Sheets

HYDROSTATIC CONTINUOUSLY VARIABLE TRANSMISSION

BACKGROUND OF THE INVENTION

1. FIELD OF THE INVENTION

The present invention relates to a hydrostatic continuously variable transmission comprising a swashplate type hydraulic pump having a pump cylinder which is integrally and coaxially coupled with a motor cylinder of a swashplate type hydraulic motor, an annular higher pressure oil passage communicating with motor ports located in an expansion stroke region of the hydraulic motor, an annular lower pressure oil passage communicating with motor ports located in a shrinkage stroke region of the hydraulic motor, both the higher and lower pressure oil passages being concentrically formed between the pump and motor cylinders, a large number of radially arranged distributor valves reciprocally movable between radially inner and outer positions to put a large number of pump ports in the hydraulic pump into alternate communication with the higher and lower pressure oil passages, and an eccentric ring circumscribed about the distributor valves and connected to an input member of the hydraulic pump for movement between a clutch OFF position and a clutch ON position, so that the distributor valves are controlled to put the pump ports located in a discharge stroke region of the hydraulic pump into communication with the higher pressure oil passage and the pump ports located in an intake stroke region into communication with the lower pressure oil passage in a first eccentric position of the eccentric ring and to bring the hydraulic pump into a short-circuited state in a second eccentric position of the eccentric ring.

2. DESCRIPTION OF THE PRIOR ART

The present applicant has already proposed such hydrostatic continuously variable transmission, as disclosed in Japanese patent Application Laid-open No. 224769/87.

In the hydrostatic continuously variable transmission already proposed, an external operating member is connected to the eccentric ring through a cam mechanism, so that the operating member is manually operated to control the position of the eccentric ring. Therefore, the structure is complicated and the operation is troublesome.

SUMMARY OF THE INVENTION

The present invention has been accomplished with such circumstances in view, and it is an object of the present invention to provide a hydrostatic continuously variable transmission which is simple in structure and in which the position of the eccentric ring can be automatically controlled in accordance with the speed of rotation of a cylindrical input member.

To attain the above object, a feature of the present invention is that a clutch spring is connected to the eccentric ring for biasing the eccentric ring toward the clutch OFF position, and a weight is added to the eccentric ring and adapted to exhibit a centrifugal force for moving the eccentric ring toward the clutch ON position against a spring force of the clutch spring.

With the above construction, when the input member is rotated, the eccentric ring is also rotated together with the input member, and a centrifugal force is produced in the weight of the eccentric ring in the opposite direction from the direction of the spring force applied to the eccentric ring by the clutch spring.

Thus, when the speed of rotation of the input member is relatively low, such centrifugal force cannot overcome the spring force of the clutch spring and hence, the eccentric ring is maintained at the clutch OFF position by the action of the clutch spring, thereby controlling the distributor valves to bring the hydraulic pump into a short-circuited state.

When the speed of rotation of the input member is increased to a level exceeding a predetermined value, such centrifugal force overcomes the spring force of the clutch spring to move the eccentric ring to the clutch ON position, thereby controlling the distributor valves to start transmitting the hydraulic pressure from the hydraulic pump to the hydraulic motor.

In this way, the control of the position of the eccentric ring can be automatically performed in accordance with the speed of rotation of the input member by the centrifugal force provided by the weight, so that the states of interception and transmission between the hydraulic pump and the hydraulic motor can be properly obtained irrespective of whether or not the operator is skilled. Moreover, since the weight is added to the eccentric ring, there is no need for a special interlocking mechanism for transmitting the centrifugal force of the weight to the eccentric ring, leading to an extremely simple structure.

The above and other objects, features and advantages of the invention will become apparent from a reading of the following description of the preferred embodiment, taken in conjunction with the accompanying drawings.

BRIEF DESCRIPTION OF THE DRAWINGS

The drawings illustrate one embodiment of the present invention, wherein.

DESCRIPTION OF THE PREFERRED EMBODIMENTS

Figure 1:
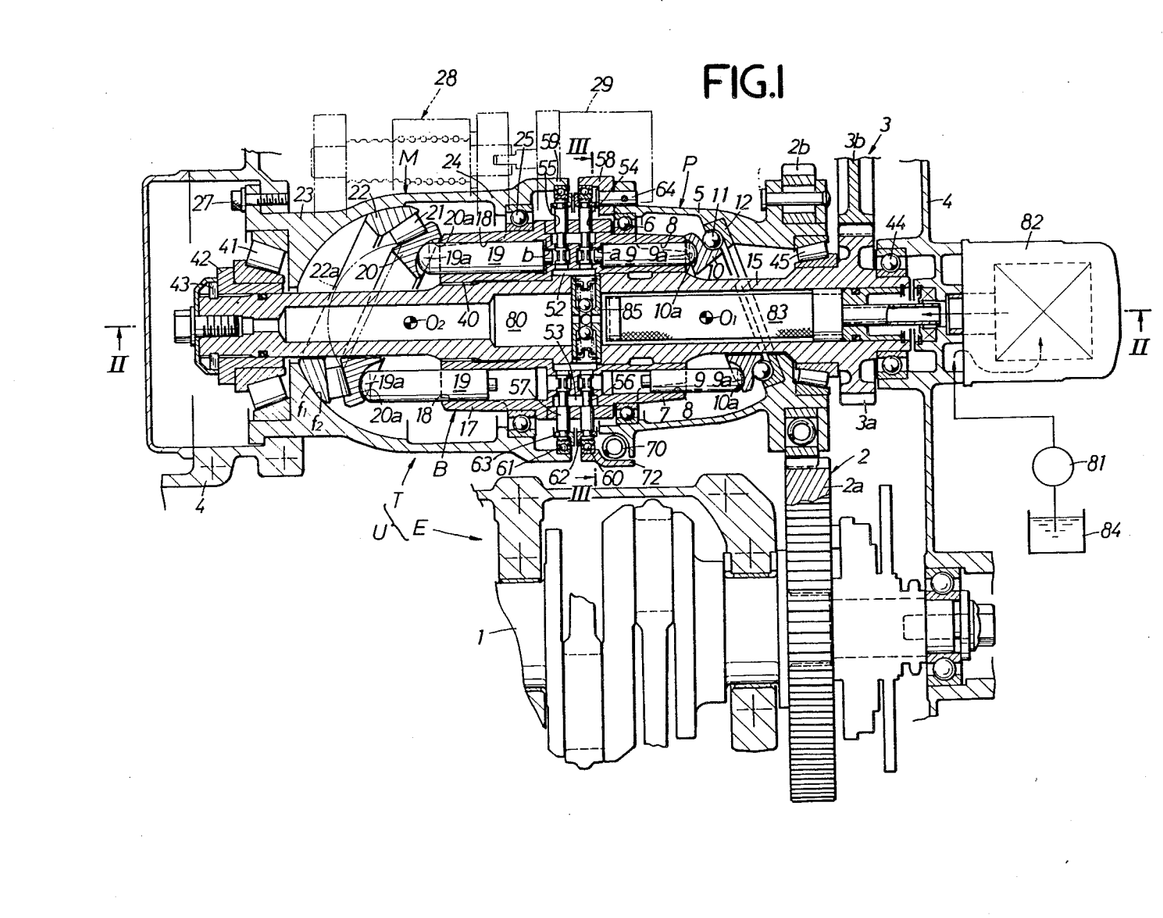
FIG. 1 is a plan view in longitudinal section of a power unit for a motorcycle equipped with a hydrostatic continuously variable transmission according to the present invention interposed in a power transmitting system for a motorcycle.

One embodiment, of the present invention will now be described with reference to the accompanying drawings. Referring first to FIG. 1, a power unit U for a motorcycle comprises an engine E and a hydrostatic continuously variable transmission T. A crank shaft 1 of the engine E and the continuously variable transmission T are contained in a common casing 4. The continuously variable transmission T includes a cylindrical input shaft 5 and an output shaft 15 disposed in parallel to the crank shaft 1, so that the crank shaft 1 drives the cylindrical input shaft 5 through a primary speed-reducing device 2, and the output shaft 15 drives a rear wheel (not shown) of the motorcycle through a secondary speed reducing device 3.

Figure 2:
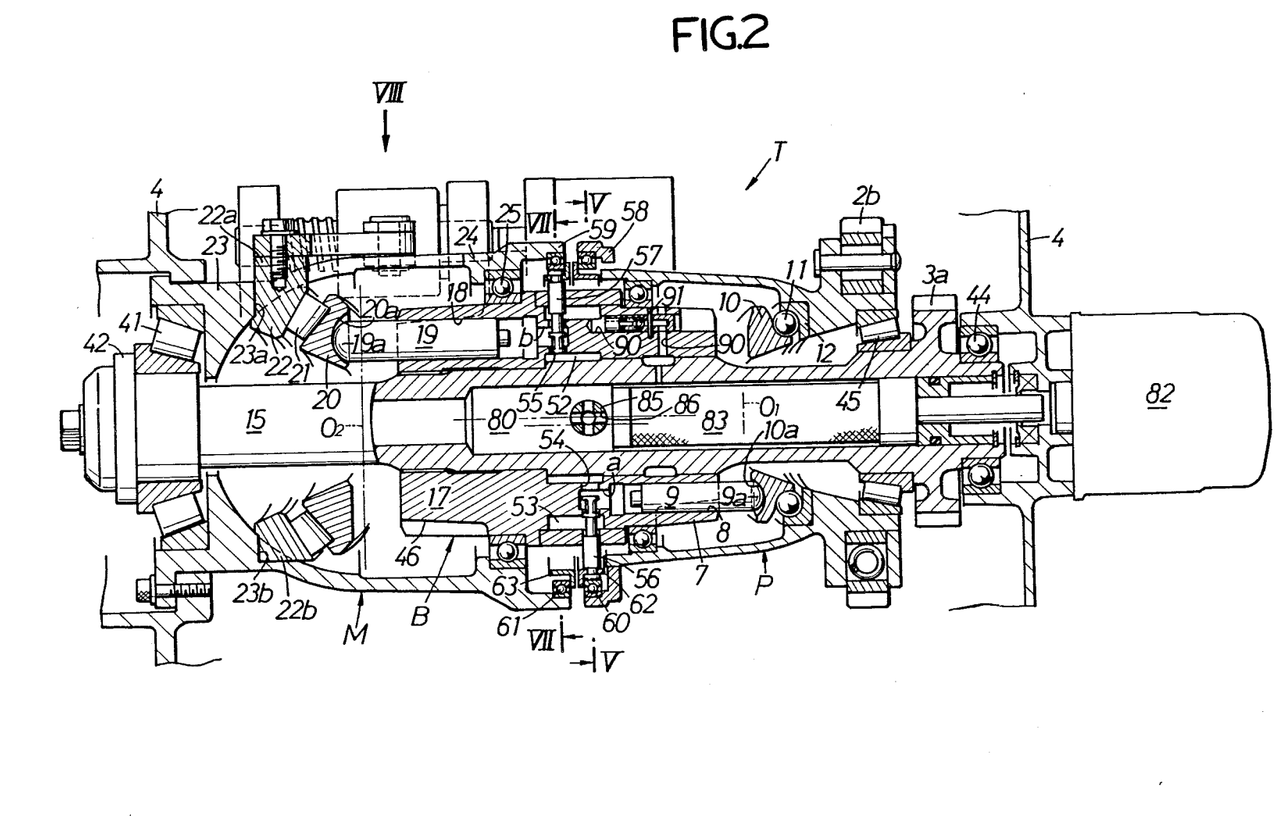
FIGS. 2 and 3 are sectional views taken along lines II—II and III—III in FIG. 1, respectively.

Referring to FIGS. 1 and 2, the continuously variable transmission T comprises a swashplate type constant volume hydraulic pump p and a swashplate type variable volume hydraulic motor M.

The hydraulic pump P is comprised of the cylindrical input shaft 5 as an input member, a pump cylinder 7 relatively rotatably fitted in an inner peripheral wall of the cylindrical input shaft 5 through a ball bearing 6, pump plungers 9, 9—slidable in a large odd number of annularly arranged cylinder bores 8, 8 —provided in the pump cylinder 7 to surround an axis of the pump cylinder 7, a pump swashplate 10 having a front face abutting against outer ends of the pump plungers 9, and a pump swashplate holder 12 for supporting a back face of the pump swashplate 10 through an angular contact bearing 11 to hold the pump swashplate 10 at a state inclined at a given angle with respect to the axis of the pump cylinder 7 about a phantom trunnion axis $O_1$ perpendicular to the axis of the pump cylinder 7. The pump swashplate holder 12 is fitted in the inner wall of the cylindrical input shaft. A driven gear $2b$ of the primary speed reducing device 2 is attached to an outer end of the cylindrical input shaft 5 through a torque damper.

The pump swashplate 10 is adapted to sequentially provide reciprocations of the pump plungers 9, 9—upon rotation of the cylindrical input shaft 5 to repeat intake and discharge strokes thereof.

On the other hand, the hydraulic motor M is comprised of a motor cylinder 17 disposed coaxially with and laterally of the pump cylinder 7, motor plungers 19, 19—slidable in the same number of annularly arranged cylinder bores 18, 18 —as the cylinder bores 8, 8—, provided in the motor cylinder 17 to surround an axis of the motor cylinder 17, a motor swashplate 20 having a front face abutting against outer ends of the motor plungers 19, 19—, a motor swashplate holder 22 for supporting a back face of the motor swashplate 20 through a tapered roller bearing 21, and a motor swashplate anchor 23 for supporting a back face of the motor swashplate holder 22. The motor swashplate anchor 23 is secured to the casing by a bolt 27.

Each of the cylinder bores 18 is formed larger in diameter than that of the cylinder bore 8, so that the maximum volume of the hydraulic motor M may be set sufficiently larger than that of the hydraulic pump P, thereby providing a large speed-reduction ratio.

The motor swashplate holder 22 is provided at opposite ends with a pair of hemi-cylindrical trunnion shafts $22a$ and $22b$ disposed on a trunnion axis $O_2$ perpendicular to the axis of the motor cylinder 17 and rotatably fitted respectively in a bearing hole $23a$ and a bearing recess $23b$ provided in the motor swashplate anchor 23. Respective abutting, opposed surfaces $f_1$ and $f_2$ of the motor swashplate holder 22 and the motor swashplate anchor 23 are each formed into a spherical surface having a center provided by an intersection of the axis of the motor cylinder 17 with the trunnion axis $O_2$. Therefore, the motor swashplate holder 22 is rotatable about the trunnion axis $O_2$ while receiving an aligning action from the motor swashplate anchor 23.

A cylindrical cylinder holder 24 is integrally connected to the motor swashplate anchor 23 to extend rightward, and the motor cylinder 17 is rotatably supported at its outer peripheral surface by the cylinder holder through a ball bearing 25.

Figure 8:
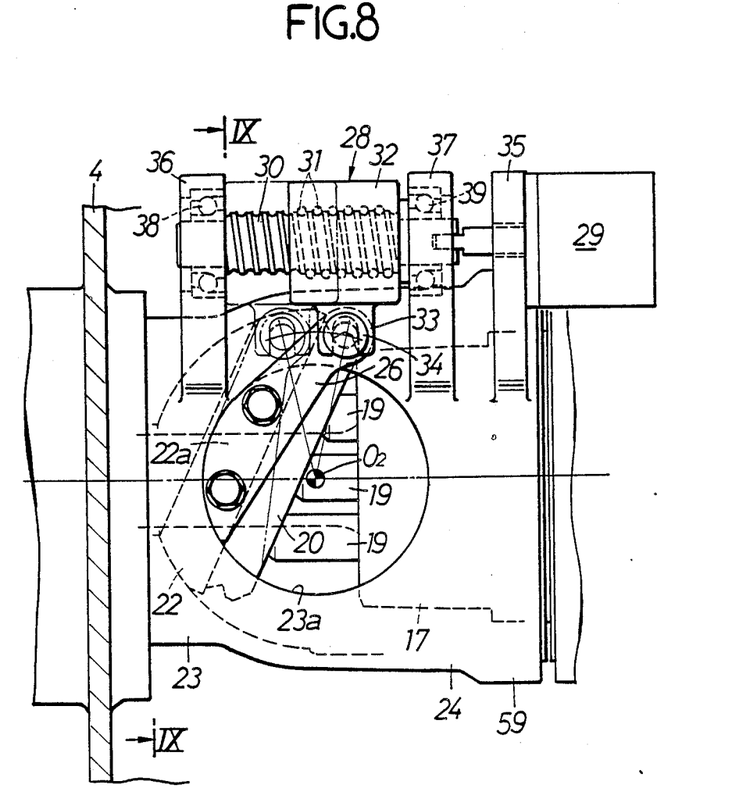
FIG. 8 is a view taken along an arrow VIII.
Figure 9:
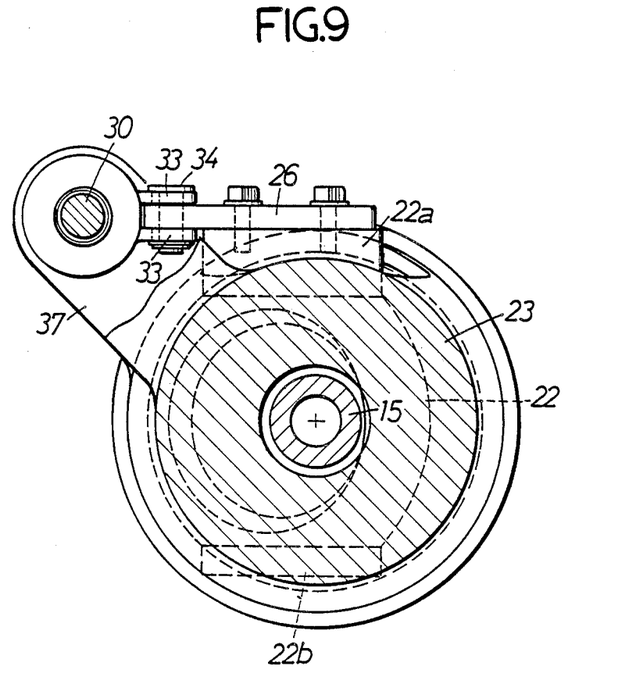
FIG. 9 is a sectional view taken along a line IX—IX in FIG. 8.
Figure 10:
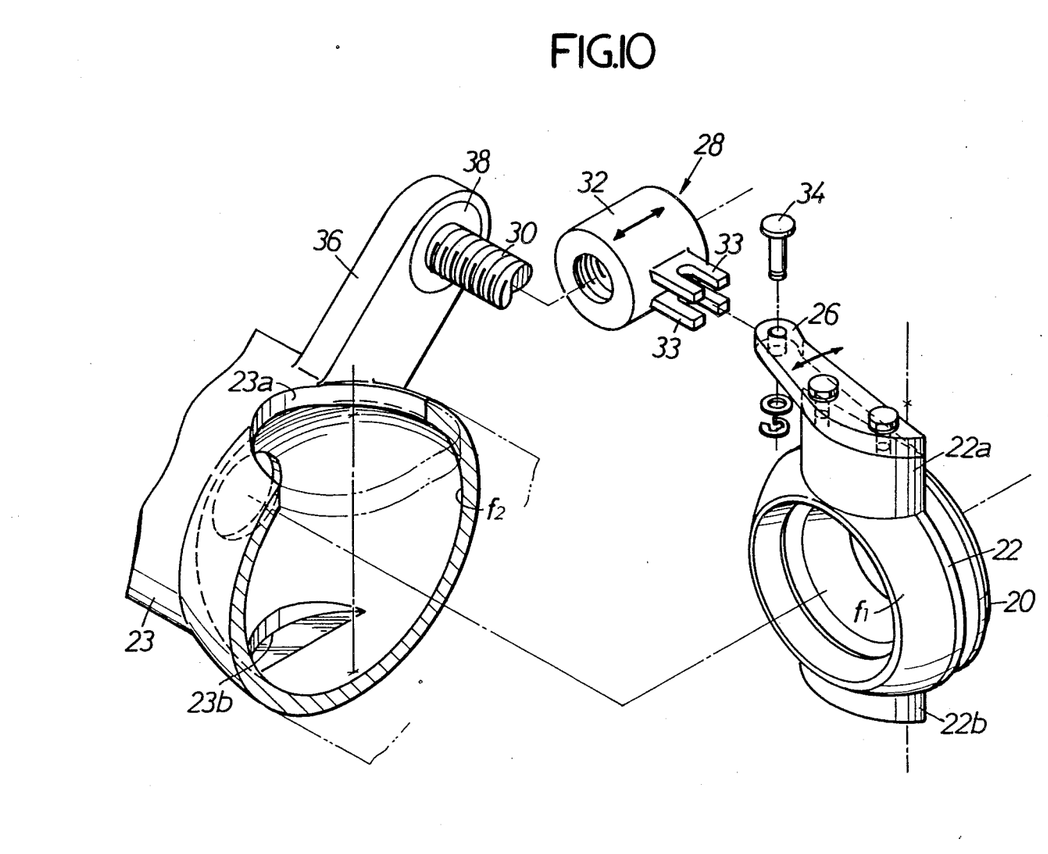
FIG. 10 is an exploded perspective view of the surrounding portion of a motor swashplate holder.

As shown in FIGS. 8 to 10, an operating lever 26 is secured to one of the trunnion shafts $22a$, and a reversible electric motor 29 is connected to the operating lever 26 through a ball/nut mechanism 28 which comprises a threaded shaft 30, and a nut 32 threadedly engaged over the threaded shaft 30 through cyclic balls 31. An output shaft of the electric motor 29 is connected to the threaded shaft 32, and a leading end of the operating lever 26 is connected through a pin 34 to a pair of forks 33 projectingly mounted on an outer surface of the nut 32.

The electric motor 29 is supported on a bracket 35 projectingly mounted on an outer surface of the cylinder holder 24, and the threaded shaft 30 is rotatably carried through ball bearings 38 and 39 on a pair of brackets 36 and 37 projectingly mounted on the outer surfaces of the motor swashplate anchor 23 and the cylinder holder 24.

Thus, if the threaded shaft 30 is normally rotated by means of the electric motor 29, the nut 32 can be moved leftward as viewed in FIG. 8, thereby rotating the motor swashplate holder 22 about the trunnion axis $O_2$ through the operating lever 26 to right the motor swashplate 20. To the contrary, if the threaded shaft is reversed, the nut 32 can be moved rightward to tilt the motor swashplate 20 down. When the motor cylinder 17, with the motor swashplate 20 inclined, is rotated, the motor swashplate 20 can produce sequential reciprocations of the motor plungers 19, 19—to repeat the expanding and contracting strokes.

Referring again to FIGS. 1 and 2, the pump cylinder 7 and the motor cylinder 17 are integrally coupled with each other to constitute a cylinder block B which is spline-connected with the output shaft 15 passed through a central portion of the cylinder block B.

A drive gear $3a$ of the secondary speed-reducing device 3 is inteqrally formed on the output shaft 15 adjacent a driven gear $2b$ of the first speed reducing device 2. Meshed portions of a drive gear $2a$ and the driven gear $2b$ in the primary speed-reducing device 2 and meshed portions of the drive gear $3a$ and a driven gear $3b$ in the secondary speed-reducing device 3 are disposed on opposite sides with respect to an axis of the output shaft 15 therebetween.

A left end of the output shaft 15 is supported on the motor swashplate anchor 23 through a tapered roller bearing 41, and a bearing holder 42 supporting an inner race of the bearing 41 is fixed to the output shaft 15 by a cotter 43.

A right end of the output shaft 15 is also supported on the casing 4 through a ball bearing 44 arranged with the drive gear $3a$ sandwiched therebetween, and supports the cylindrical input shaft 5 through a tapered roller bearing 45.

In order to rotate the pump swashplate 10 synchronously with the pump cylinder 7, the pump swashplate 10 is provided with a spherical recess $10a$ in which a spherical end $9a$ of the corresponding pump plunger 9 is engaged.

In addition, in order to rotate the motor swashplate 20 synchronously with the motor cylinder 17, the motor swashplate 20 is also provided with a spherical recess 20a in which a spherical end 19a of the corresponding motor plunger 19 is engaged.

Any of the spherical recesses 10a and 20a is formed to have a radius larger than the radii of the spherical ends 9a and 19a, so that the engagement with the spherical ends 9a and 19a may be assured in any position.

Figure 11:
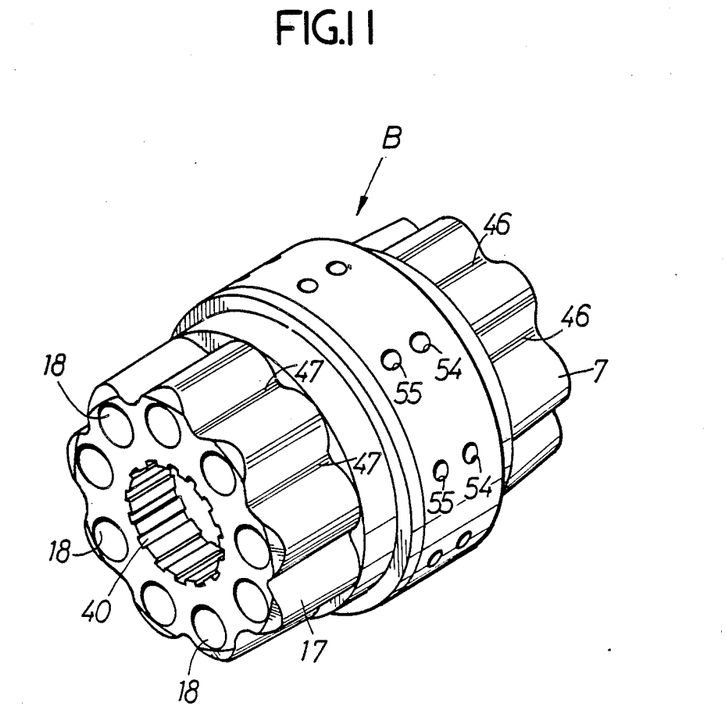
FIG. 11 is a perspective view of a cylinder block.

Each of outer peripheral surfaces of the pump cylinder 7 and the motor cylinder 17 is provided with a large number of grooves 46, 47 for reducing the weight between the adjacent cylinder bores 8, 8—; 18, 18—, as shown in FIG. 11.

Figure 5:
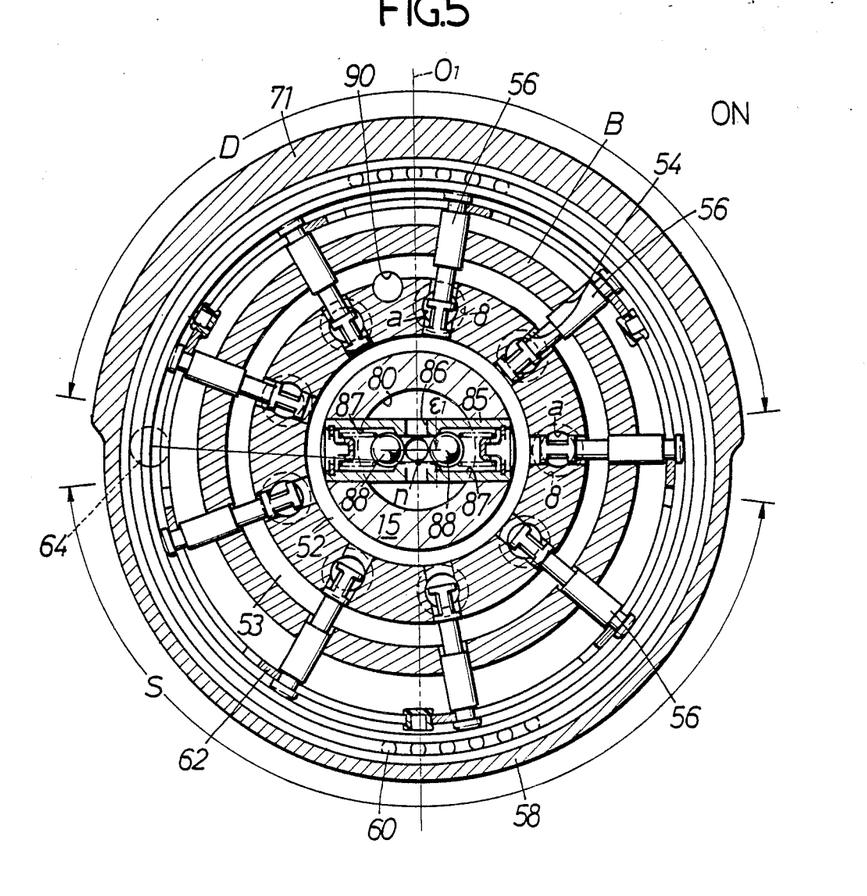
FIG. 5 is a sectional view taken along a line V—V in FIG. 2, illustrating an eccentric ring in a clutch ON position.

Referring to FIGS. 1, 2 and 5, between the group of the cylinder bores 8, 8—in the pump cylinder 7 and the group of the cylinder bores 18, 18—in the motor cylinder 17, the cylinder block B is provided with an annular inner oil passage 52 and an annular outer oil passage 53 which are concentrically arranged about the output shaft 15, first and second valve bores 54, 54—and 55, 55—of the same number respectively as the cylinder bores 8, 8—and 18, 18—radially passed through annular partition wall between the both oil passages 52 and 53 as well as an outer peripheral wall of the outer oil passage 53, pump ports a, a, —each permitting the communication between the adjacent cylinder bore 8 and first valve bore 54, and a large number of motor ports b, b—each permitting the communication between the adjacent cylinder bore 18 and second valve bore 55.

The inner oil passage 52 is provided in the form of an annular groove in an inner peripheral surface of the cylinder block B, with its opened face closed by an outer peripheral surface of the output shaft 15.

Each of spool type first distributor valves 56, 56—is slidably received in the corresponding one of the first valve bores 54, 54—, and each of likewise spool type second distributor valves 57, 57—is slidably received in the corresponding one of the second valve bores 55, 55—. A first eccentric ring 58 is engaged on outer ends of the first distributor valves 56, 56—through ball bearings 60 to surround them, and a second eccentric ring 59 is engaged on outer ends of the second distributor valves 57, 57—through ball bearings 61 to surround them. To force these engagements, the outer ends of the first distributor valves 56, 56—are interconnected by a first forcing ring 62 concentric with the first eccentric ring 58, and the outer ends of the second distributor valves 57, 57—are interconnected by a second forcing ring 63 concentric with the second eccentric ring 59.

Figure 3:
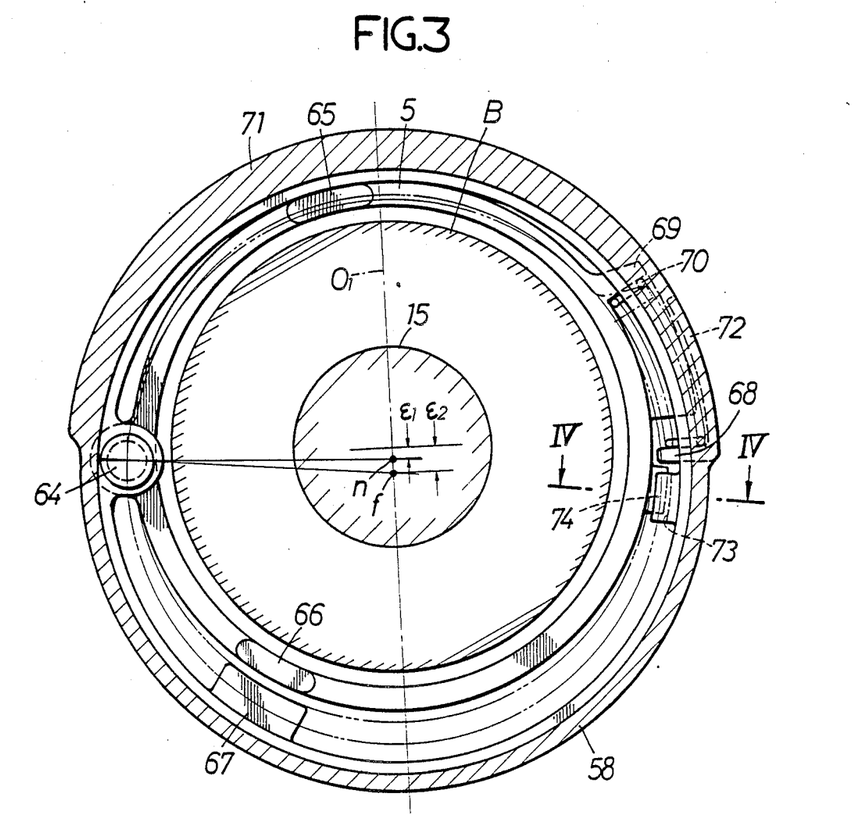

The eccentric ring 58, as shown in FIG. 3, is connected to an inner end of the cylindrical input shaft 5 through a pivot 64 parallel to the output shaft 15, for swinging movement between a clutch ON position n and a clutch OFF position f. The first eccentric ring 58 assumes a location eccentrically offset a predetermined distance $\epsilon_1$ from the center of the output shaft 15 along the trunnion axis $O_1$ in the clutch ON position n, and also assumes a location eccentrically offset a distance $\epsilon_2$ greater than such eccentric amount $\epsilon_1$ from the center of the output shaft 15 in the clutch OFF position f. The clutch OFF position f is defined by an inner peripheral edge of the first eccentric ring 58 abutting against a first stopper 65, projectingly mounted on an inner end face of the input shaft 5, while the clutch ON position n is defined by an inward directed projection 67 of the first eccentric ring 58 abutting against a second stopper 66 projectingly mounted on the inner end face of the input shaft 5 on the opposite side from the first stopper 65.

The first eccentric ring 58 and the cylindrical input shaft 5 are provided respectively with spring-receiving pieces 68 and 69 projecting therefrom and circumferentially opposed to each other on the opposite side from the pivot 64, and a clutch spring 70 is mounted in compression between the spring-receiving pieces, so that the first eccentric ring 58 is biased toward the clutch OFF position f by a spring force of the clutch spring 70.

Further, the first eccentric ring 58 is integrally formed with a weight 71 which exhibits a centrifugal force toward the clutch ON position n during rotation of the first eccentric ring 58.

Yet further, the first eccentric ring 58 is formed with a canopy 72 connected to the spring-receiving piece 68 for covering the spring 70.

Figure 4:
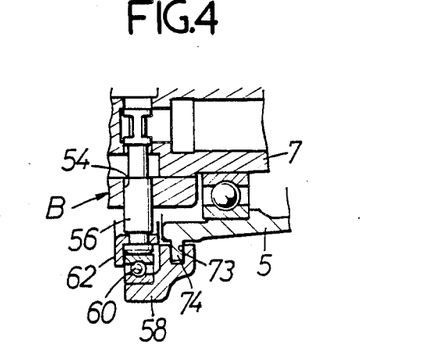
FIG. 4 is a sectional view taken along a line IV—IV in FIG. 3.

Still further, the first eccentric ring 58 and the cylindrical input shaft 5 are provided, on the opposite side from the pivot 64, respectively with a guide groove 73 and a guide projection 74 which slidably engage each other to define a path of swinging movement of the first eccentric ring 58 about the pivot 64 (see FIGS. 3 and 4).

Thus, as a relative rotation is produced between the cylindrical input shaft 5 and the pump cylinder 7 when the first eccentric ring 58 assumes the clutch ON position n as shown in FIG. 5, each first distributor valve 56 is reciprocated in the first valve bore 54 between radially inner and outer positions in the pump cylinder 7 with a stroke two times the eccentric amount $\epsilon_1$ by the first eccentric ring 58. In a discharge region D of the hydraulic pump P, the first distributor valve 56 is moved in the inner position to put the corresponding pump port a into communication with the outer oil passage 53 and out of communication with the inner oil passage 52. In the intake region S, the first distributor valve 56 is moved in the outer position to put the corresponding pump port a into communication with the inner oil passage 52 and out of communication with the outer oil passage 53.

Figure 6:
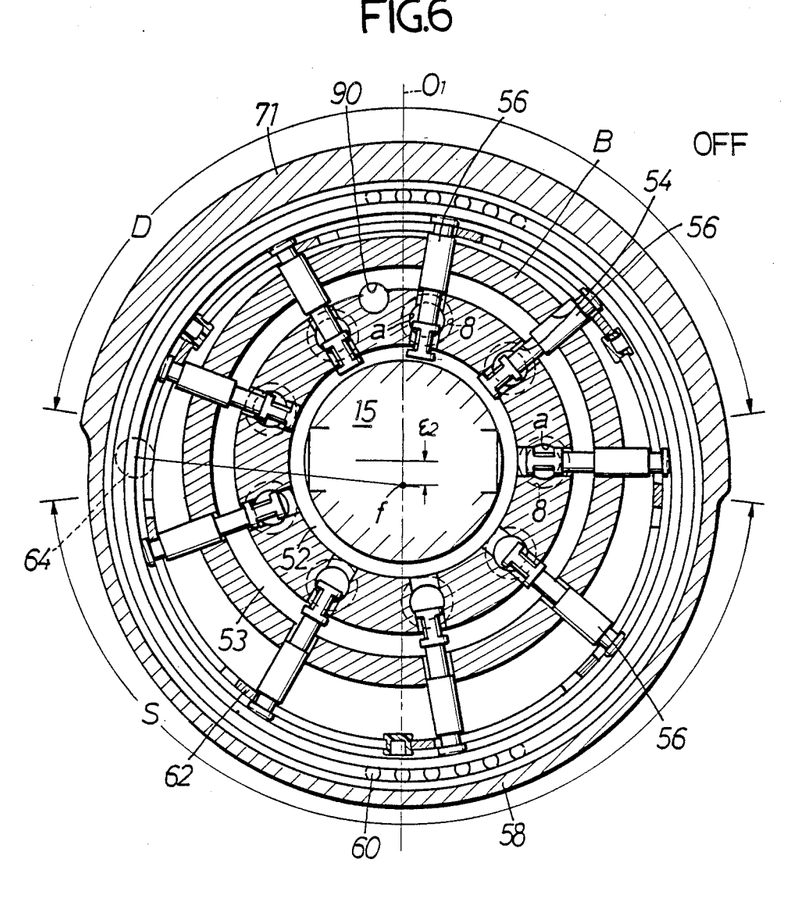
FIG. 6 is a sectional view similar to FIG. 5, but illustrating the eccentric ring in a clutch OFF position.

As a relative rotation is produced between the cylindrical input shaft 5 and the pump cylinder 7 when the first eccentric ring 58 assumes the clutch OFF position f (see FIG. 6), each first distributor valve 56 is reciprocated in the first valve bore 54 between the radially inner and outer positions in the pump cylinder 7 with a stroke two times the eccentric amount $\epsilon_2$ by the first eccentric ring 58, and in the inner and outer positions, the first distributor valve 56 permits the direct communication between the inner and outer oil passages 52 and 53.

Figure 7:
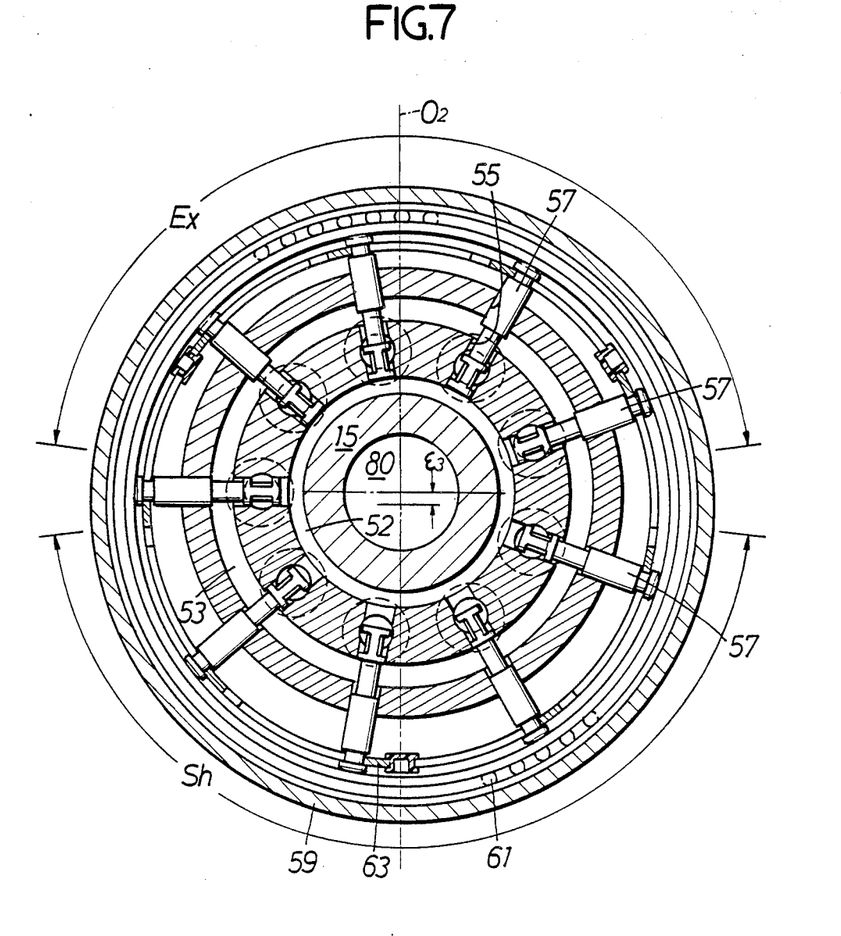
FIG. 7 is a sectional view taken along a line VII—VII in FIG. 2.

On the other hand, the second eccentric ring 59 is integrally coupled to the cylinder holder 24 to assume a location eccentrically offset a predetermined distance $\epsilon_3$ from the center of the output shaft 15 along the trunnion axis $O_2$, as shown in FIG. 7.

Thus, when the motor cylinder 17 is rotated, each second distributor valve 57 is reciprocated in the second valve bore between radially inner and outer positions in the motor cylinder 17 with a stroke two times the eccentric amount $\epsilon_3$ by the second eccentric ring 59. In an expansion region Ex of the hydraulic motor M. the second distributor valve 57 is moved in the inner position to put the corresponding motor port b into communication with the outer oil passage 53 and out of communication with the inner oil passage 52. In the contraction or shrinkage region Sh, the second distributor valve 57 is moved in the outer position to put the corresponding motor port b into communication with the inner oil passage 52 and out of communication with the outer oil passage 53.

In the above construction, when the cylindrical input shaft 5 of the hydraulic pump P is driven from the engine E through the primary speed reducing device 2, causing the pump swashplate 10 to alternately provide the discharge and intake strokes to the pump plungers 9, 9—, each pump plunger 9 allows a working oil to be pumped from the cylinder bore 8 into the outer oil passage 53 during passing through the discharge region, and allows the working oil to be drawn into the cylinder bore 8 from the inner oil passage 52 during passing through the intake region S.

Now, in an idling condition of the engine E, the speed of rotation of the cylindrical input shaft 5 is lower, and the centrifugal force exhibited by the weight 71 of the first eccentric ring 58 rotated with the cylindrical input shaft 5 is weaker and for this reason, the first eccentric ring 58 is maintained at the clutch OFF position f by the action of the spring 70. Therefore, the first distributor valve 56 permits the direct communication between the inner and outer oil passages 52 and 53, as described above, so that the cylinder bore 8 containing the pump plunger 9 which is in the intake stroke and the cylinder bore 8 containing the pump plunger 9 which is in the discharge stroke become short-circuited through the inner and outer oil passages 52 and 53, and transmission of any hydraulic pressure does not occur.

As the rotation of the engine E and thus the cylindrical input shaft 5 is increased, the centrifugal force provided by the weight 71 is increased, and if the centrifugal force exceeds a set load of the clutch spring 70, the first eccentric ring 58 moves around the pivot 64 toward the clutch ON position n.

When the first eccentric ring 58 has reached the clutch ON position n, the first distributor valve 56 puts the pump port a into communication with the inner oil passage 52 and out of communication with the outer oil passage 53 in the intake region S, and puts the pump port a into communication with the outer oil passage 53 and out of communication with the inner oil passage 52 in the discharged regional so that the working oil pumped into the outer oil passage by the pump plunger 9 which is in the discharge stroke is supplied into the cylinder bore 18 of the motor plunger 19 located in the expansion region Ex of the hydraulic motor M, and discharged out of that cylinder bore 18 into the inner oil passage 52 by the motor plunger 19 located in the shrinkage region Sh.

During this time, the cylinder block B is rotated by the sum of a reaction torque received by the pump cylinder 7 from the pump swashplate 10 through the pump plunger 9 which is in the discharge stroke and a reaction torque received by the motor cylinder 17 from the motor swashplate 20 through the motor plunger 19 which is in the expansion stroke, and such rotating torque is transmitted from the output shaft 15 to the secondary speed-reducing device 3.

When the first eccentric ring 58 is passing between the clutch OFF position f and the clutch ON position n, a portion of the working oil discharged from the hydraulic pump p is short-circuited to the intake side, and the remaining thereof is supplied to the hydraulic motor M, resulting in a semi clutch condition where the transmission of hydraulic pressure from the hydraulic pump P to the hydraulic motor M is moderately suppressed. Thus, as the rotation of the engine E is increased, the transmission of hydraulic pressure from the hydraulic pump P to the hydraulic motor M is automatically started, and the vehicle smoothly starts to travel.

The gear shift ratio of the output shaft 31 to the cylindrical input shaft 5 can be determined by the following equation:

$$\text{Gear shift ratio} = 1 + \frac{\text{Volume of hydraulic motor } M}{\text{Volume of hydraulic pump } P}$$

Therefore, if the volume of the hydraulic motor M is varied from zero to a certain value, the gear shift ratio can be changed from 1 to a certain required value. Moreover, because the volume of the hydraulic motor M is determined by the stroke of the motor plunger 19, the gear shift ratio can be continuously varied from 1 to a certain value by tilting the motor swashplate 20 from its upright position to a certain inclined position.

During operation of the transmission T, the pump swashplate 10 receives a thrust load from the pump plungers 9, 9 —, and the motor swashplate 20 receives a thrust load in the opposite direction from the motor plungers 19, 19—. However, the thrust load received by the pump swashplate 10 is supported on the output shaft 15 through the angular contact bearing 11, the pump swashplate holder 12, the cylindrical input shaft 5, the tapered roller bearing 45 and the drive gear 3a, while the thrust load received by the motor swashplate 20 is supported on the output shaft 15 through the tapered roller bearing 21, the motor swashplate holder 22, the motor swashplate anchor 23, the tapered roller bearing 41, the bearing holder 42 and cotter 43. Thus, the thrust loads only cause the output shaft 15 to produce a tensile stress, and do not act on the casing 4 supporting the shaft 15 at all.

In this case, the motor swashplate holder 22 supports on its front face the motor swashplate 20 through the tapered roller bearing 21 and has its back face supported on the motor swashplate anchor 23 and hence, even if it receives a thrust load from the motor plungers 19, 19—through the motor swashplate 20, it cannot generate any deflection. Moreover, since the motor swashplate holder 22 and the motor swashplate anchor 23 have their spherical surfaces $f_1$ and $f_2$ opposed to each other and having the center provided by the intersection of the axis of the motor cylinder 17 with the trunnion axis $O_2$, the motor swashplate 22 exhibits an aligning function by an interaction of these spherical surfaces. Consequently, the motor swashplate holder 22 can be smoothly rotated about the trunnion axis $O_2$ to easily control the inclined angle of the motor swashplate 20. In this case, the rotation of the motor swashplate holder 22 about any axis other than the trunnion axis $O_2$ is inhibited by engagement of the trunnion shafts 22a and 22b of the motor swashplate holder 22 with the bearing hole 23a and the bearing recess 23b in the motor swashplate anchor 23.

In addition, the motor swashplate anchor 23 having the concave spherical surface $f_2$ is increased in wall thickness from its central portion toward its peripheral edge and has a high rigidity and hence, can sufficiently withstand a larger load from the motor swashplate holder 22 and the tapered roller bearing 21.

The driven gear 2b and the drive gear 3a provided respectively on the concentrically disposed input and output shafts 5 and 15 are disposed axially adjacent each other, and moreover, the drive gear 2a meshed with the driven gear 2b, and the driven gear 3b meshed with the drive gear 3a are disposed on the opposite sides from each other with respect to the axis of the output shaft 15. Therefore, even if large radial loads are applied respectively to the driven gear 2b and the drive gear 3a from the mating gears 2a and 3b during transmission, a flexing moment and a swinging moment applied to the output shaft 15 due to the both loads are extremely small, because the directions of the both loads are opposite and moreover, the distance between the points of application of the both loads is extremely small. Consequently, it is possible to reduce the loads of the bearings 41 and 44 supporting the opposite ends of the output shaft 15 to prolong the life of the bearings 41 and 44.

Referring again to FIGS. 1, 2 and 5, the output shaft 15 is projectingly provided at its central portion with a central oil passage 80 closed at one end, &o which the working oil is supplied from a supplement pump 81 through primary and secondary oil filters 82 and 83. The supplement pump 81 is driven from the crank shaft 1 through a transmission device (not shown) to draw an oil from an oil reservoir 84 provided in the bottom of &he casing 4. The primary oil filter 82 is mounted on a righthand wall of the casing 4 in an opposed relation to an inlet of the central oil passage 80, and the secondary oil filter 83 is mounted in the central oil passage 80 to extend from the inlet thereof to a central portion thereof.

A valve case 85 is fitted in the central portion of the output shaft 15 adjacent an inner end of the secondary oil filter 83 and across the central oil passage 80, with its opposite ends faced on the inner oil passage 52. As clearly shown in FIG. 5, the valve case 85 includes a cross shaped transverse hole 86 opened into the central oil passage 80, and a pair of valve chests 87, 87 which are opposed to each other with the transverse hole 86 interposed therebetween and permit the transverse hole 86 to communicate with the inner oil passage 52. A first check valve 88 is contained in each of the valve chests 87 for blocking the reverse flow of the oil from the inner oil passage 52 into the central oil passage 80.

The inner peripheral surface of the cylinder block B is opposed to opposite ends of the valve case 85 at a very small gap (see FIG. 1), thereby preventing the valve case 85 from being withdrawn from the output shaft 15.

The output shaft 15 and the cylinder block B are provided with a serial supplement oil passage 90 connecting the central oil passage upstream from the valve case 85 with the outer oil passage 53, and a second check valve 91 is interposed on the way to the supplement oil passage 90 for blocking the reverse flow of the oil from the outer oil passage 53 into the central oil passage 80.

Thus, if the pressure in the lower pressure side inner oil passage 52 is reduced to a lever lower than the pressure in the central oil passage, during a normal load opera&ion in which the hydraulic motor M is hydraulically driven from the hydraulic pump P, due to leakage of the oil through a hydraulic closed circuit between the hydraulic motor and pump, the first check valves 88, 88 are opened, permitting the working oil to be supplemented from the central oil passage 80 into the inner oil passage 52. During this time, on the other hand, the working oil in the higher pressure-side outer oil passage is blocked from flowing into the central oil passage 80 by the second check valve 91.

During a reverse load operation, i.e., during an engine braking, the hydraulic motor M performs a pumping action, while the hydraulic pump p performs a motoring action, so that the outer oil passage 53 is changed to the lower pressure side, while the inner oil passage 52 is to the higher pressure side. Therefore, if the pressure in the outer oil passage 53 is reduced to a level lower than the pressure in the central oil passage 80 due to leakage of the oil, the second check valve 91 is opened, permitting the working oil to be supplemented from the central oil passage 80 into the outer oil passage 53, and the flow of the working oil out of the inner oil passage 52 into the central oil passage 80 is blocked by the first check valves 88, 88.

What is claimed is:

1. A hydrostatic continuously variable transmission comprising a swashplate type hydraulic pump having a pump cylinder which is integrally and coaxially coupled with a motor cylinder of a swashplate type hydraulic motor, an annular higher pressure oil passage communicating with motor ports located in an expansion stroke region of said hydraulic motor, an annular lower pressure oil passage communicating with motor ports located in a shrinkage stroke region of said hydraulic motor, said both oil passages being concentrically formed between the pump and motor cylinders, a large number of radially arranged distributor valves reciprocally movable between radially inner and outer positions to put a large number of pump ports in said hydraulic pump into alternate communication with said higher and lower pressure oil passages, and an eccentric ring circumscribed about the distributor valves and connected to an input member of said hydraulic pump for movement between a clutch OFF position and a clutch ON position, so that the distributor valves are con&rolled to put the pump ports located in a discharge stroke region of said hydraulic pump into communication with the higher pressure oil passage and the pump ports located in an intake stroke region into communication with the lower pressure oil passage in a first eccentric position of the eccentric ring and to bring said hydraulic pump into a short-circuited state in a second eccentric position of the eccentric ring, said eccentric ring including a clutch spring connected thereto for biasing the eccentric ring toward said clutch OFF position, and a weight added thereto and adapted to exhibit a centrifugal force for moving the eccentric ring toward said clutch ON position against a spring force of the clutch spring.

* * * * *